United States Patent
Higuchi et al.

(10) Patent No.: US 7,149,075 B2
(45) Date of Patent: *Dec. 12, 2006

(54) SOLID ELECTROLYTIC CAPACITOR

(75) Inventors: Kazuhiro Higuchi, Nagai (JP); Akihiro Inoue, Nagai (JP); Akio Ishii, Ome (JP); Kazuhiro Saegusa, Ome (JP); Kazuhiro Hatanaka, Ome (JP)

(73) Assignee: Nippon Chemi-Con Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,903

(22) Filed: Dec. 5, 2005

(65) Prior Publication Data

US 2006/0139851 A1    Jun. 29, 2006

Related U.S. Application Data

(62) Division of application No. 10/479,651, filed on Dec. 1, 2003, now Pat. No. 7,009,144.

(51) Int. Cl.
*H01G 9/00* (2006.01)

(52) U.S. Cl. .................. 361/523; 361/525; 361/528

(58) Field of Classification Search ........... 361/523, 361/525, 528–529, 512
See application file for complete search history.

(56) References Cited

U.S. PATENT DOCUMENTS

| | | | |
|---|---|---|---|
| 3,330,999 A | 7/1967 | Hellicar | |
| 3,679,944 A | 7/1972 | Yoshimura et al. | |
| 4,943,892 A | 7/1990 | Tsuchiya et al. | |
| 5,117,332 A | 5/1992 | Kudoh et al. | |
| 5,140,502 A | 8/1992 | Kudoh et al. | |
| 6,033,471 A | 3/2000 | Nakanishi et al. | |
| 6,426,861 B1 | 7/2002 | Munshi | |
| 6,493,211 B1 | 12/2002 | Sugiyama et al. | |
| 2004/0156150 A1 | 8/2004 | Higuchi et al. | |

FOREIGN PATENT DOCUMENTS

| | | |
|---|---|---|
| GB | 941035 | 11/1963 |
| GB | 1071217 | 9/1964 |
| JP | 55-27457 B1 | 7/1980 |
| JP | 9-148200 A | 6/1997 |
| JP | 11-26320 A | 1/1999 |
| JP | 2000-228332 A | 8/2000 |
| JP | 2002-100538 | 5/2002 |
| TW | 771-05367 | 9/1989 |

OTHER PUBLICATIONS

Ha, Nguyen T, Supplemental Office Action, Nov. 19, 2004, p. 1-3, United States Patent and Trademark Office, US.

*Primary Examiner*—Eric W. Thomas
(74) *Attorney, Agent, or Firm*—Richard A. Dunning, Jr.

(57) ABSTRACT

There is a solid electrolytic capacitor having a low ESR characteristic. In accordance with the solid electrolytic capacitor using an capacitor element wherein solid electrolyte is formed, the post-etching void factor of the anode foil used for the capacitor element is set at not more than 51% or the post-etching void factor of the cathode foil used for the capacitor element is set at not more than 44%, so that an electrode foil increases in conductivity and decreases in resistivity, to thereby obtain, coupled with the solid electrolyte of a low resistivity, a solid electrolytic capacitor having a lower ESR characteristic.

8 Claims, No Drawings

SOLID ELECTROLYTIC CAPACITOR

CROSS-REFERENCE TO RELATED APPLICATION

This application is a divisional application of U.S. Nonprovisional Patent application Ser. No. 10/479,651, entitled "Solid Electrolytic Capacitor", filed Dec. 1, 2003 now U.S. Pat. No. 7,009,144, the disclosure thereof incorporated by reference herein in its entirety.

TECHNICAL FIELD

The present invention relates to a solid electrolytic capacitor using a solid electrolyte as an electrolyte.

BACKGROUND ART

Electronic information devices have been digitalized in recent years, and the increase in driving frequency of microprocessor units (MPU) as a core part of these electronic information devices has been in progress, resulting in an increase in electric power consumption, and raising a remarkable problem of reliability caused by heat generation. As a countermeasure against this, attempts to reduce the driving voltage have been made. As a circuit for supplying a highly accurate electric power to the microprocessor, a DC-DC converter so called as a voltage regulator module (VRM) has widely been used. For an output-side capacitor, a large number of capacitors with low equivalent series resistances (ESR) are used for preventing any voltage drop. As a capacitor having this low ESR characteristic, a solid electrolytic capacitor using a solid electrolyte as an electrolyte has been practiced in use and widely used as a capacitor suitable for these purposes.

The increase in driving frequency of the microprocessor has been remarkable, however, with increasing the power consumption. In order to respond to that, the increase of the power supplied from the capacitor has been requested for preventing any voltage drop. In other words, a large power supply must be made in a short time, for which purpose the above-mentioned solid electrolytic capacitor is needed to not only be increased in capacity and decreased in size and voltage but also have an ESR characteristic lower than ever.

The solid electrolytic capacitor will be then described. A valve action metal foil such as aluminum, tantalum and niobium is subjected to an etching for increasing a surface-area thereof. Then, an etching is performed on the anode foil on which an anode foil oxide film was formed and also on the valve action metal foil such as aluminum, tantalum and niobium, so that a cathode foil is formed. The anode foil and the cathode foil is laminated through a separator comprising kraft paper, Manila paper, glass separator, or nonwoven fabric made of synthetic fiber such as vinylon and polyester. After an anode plug and a cathode plug are connected respectively to said anode foil and said cathode foil at optional positions, then the anode and cathode foils are rolled to form a capacitor element. A solid electrolyte is formed in this capacitor element, and the capacitor element is contained in a metal case. Then, the opening of the metal case is sealed tightly by use of a sealing resin comprising such resin as epoxy resin or by inserting a sealing rubber in the opening for a closing process.

In accordance with the solid electrolytic capacitor constructed as described above, used as the electrolyte is a solid electrolyte having a lower resistivity of not more than several tends$\Omega$-cm compared with the conventional electrolytic solution having a resistivity of the order of 100 $\Omega$-cm. Accordingly, the solid electrolytic capacitor has a good ESR characteristic, as described above.

By the way, for the solid electrolyte, manganese dioxide with a resistivity of a few $\Omega$-cm has been used conventionally. Later on, a solid electrolytic capacitor using polymers of TCNQ complex, polypyrrole and thiophene dielectric with resistivities of not more than 1 $\Omega$-cm has been put into practical use. With a further increase in driving frequency of MPU, there has been a request for a capacitor having a smaller size, a larger capacity and a lower ESR. According to the studies by the inventors, such solid electrolytic capacitor has an insufficient effect of reducing the ESR thereof, despite the low resistivity of the electrolyte.

As described above, there is a limitation to the reduction of the ESR of the capacitor solely by lowering the resistivity of the solid electrolyte to thereby improve the solid electrolyte, and a further reduction of the ESR remains as a difficult problem.

The present invention was made to solve the above-described problem and provides a solid electrolytic capacitor which uses the solid electrolyte of a low resistivity and achieves a further lower ESR.

DISCLOSURE OF THE INVENTION

Having made committed studies to solve the above problem, the inventors found out that if the void factor of the etched foil to be used for the electrode foil of the capacitor element is optimized, it is possible to reduce the resistivity of the electrode foil of the capacitor element and further reduce the ESR of the solid electrolytic capacitor.

Namely, in accordance with the solid electrolytic capacitor wherein a solid electrolyte is formed in the capacitor element, an etched foil having a void factor of not more than 51% is used as the etched foil to be used for the anode foil of said capacitor element. This etched foil is subjected to conversion or anodic oxidation to obtain the anode foil of the present invention. By setting the void factor of the etched foil at 51% or less, the anode foil increases in conductivity and decreases in resistivity, to thereby achieve, coupled with the solid electrolyte of a low resistivity, a solid electrolytic capacitor having an unprecedentedly low ESR characteristic. If the void factor exceeds 51%, however, the anode foil increases in resistivity, and a desirable ESR characteristic cannot be obtained. Further, if the void factor is 20% or more, a high capacity is obtained and thus it is preferable. The void factor of the etched foil means in this case a value obtained by dividing the void volume of the etched foil by the apparent volume of the etched foil.

Further, if the foil thickness of the anode foil of the above-described solid electrolytic capacitor is not less than 70 μm, the anode foil decreases in resistivity to reduce the ESR, while if the foil thickness of the anode foil is not more than 180 μm, downsizing of a capacitor is attainable, and thus it is preferable that the foil thickness is 70~180 μm.

Still further, in accordance with the solid electrolytic capacitor wherein the solid electrolyte is formed in the capacitor element, an etched foil of a void factor of not more than 44% is used as the etched foil to be used for the cathode foil of said capacitor element. By setting the void factor of the etched foil at 44% or less, the cathode foil decreases in resistivity, to thereby achieve, coupled with the organic semiconductor of a low resistivity, a solid electrolytic capacitor having an unprecedentedly low ESR characteristic. If the void factor exceeds 44%, however, the cathode foil increases in resistivity, and a desirable ESR characteristic cannot be obtained. Further, if the void factor is 10% or more, a high capacity is obtained, and thus it is preferable.

Furthermore, if the foil thickness of the cathode foil of the above-described solid electrolytic capacitor is in the rage of 50–180 μm, the ESR further decreases and downsizing of a capacitor is attainable, and thus it is preferable.

To add mode, in the above-described solid electrolytic capacitor formed by rolling the electrode foils, the electrode foils of the capacitor are long and the resistivity of the electrode foils themselves is essentially large, for which reason the ESR-reducing effect of the whole capacitor is extremely large.

If a TCNQ complex is used in this case as a solid electrolyte, it is possible to achieve a low ESR of 5~8 mΩ in response to the recent requests.

Moreover, if a polymer of thiophene dielectric represented by (Chem. 1) is used, it is possible to obtain an ESR the same as or higher than the ESR when the TCNQ complex is used. In addition, the heat resistance of the capacitor improves, and thus it is preferable. The most preferable among others is 3,4-ethylene-dioxy-thiophene having a good reactivity and good electric properties.

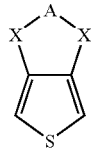

(Chem. 1)

In this case, X is O or S; when X is O, A is alkylene or polyoxyalkylene; and when at least either one of X is S, A is alkylene, polyoxyalkylene, substituted alkylene or substituted polyoxyalkylene, wherein the substituent is alkyl group, alkenyl group or alkoxy group.

Further, if manganese dioxide is used as the solid electrolyte, the heat resistance improves, and thus it is preferable.

THE BEST MODE FOR CARRYING OUT THE INVENTION

The embodiments of the present invention will be then described specifically. An aluminum foil is subjected to an alternate etching in an etching solution consisting of such solution as a hydrochloric acid solution for surface roughening, and the void factor is set at not more than 51%. Further, in order to form a dielectric film, the aluminum foil is subjected to a conversion in a conversion solution consisting of such solution as a phosphoric acid solution to form an anode foil. By setting the void factor of an etched foil at not more than 51%, preferably not more than 43%, and more preferably not more than 37%, the anode foil increases in conductivity and decreases in resistivity, as a result of which the ESR of the solid electrolytic capacitor is reduced. As described above, the present invention reduces the void factor for increasing conductivity of the electrode foils so as to reduce the ESR, and thus the effect of the present invention will not decrease, independently of the conditions of the depth and the area ratio of an etching pit, for example, even on condition that the etching pits are different in depth between the both sides of the etched foil. Furthermore, in order to ensure the maximum capacity-volumetric efficiency, if the void factor is not less than 20%, the etching area increases to obtain a high capacity, and thus it is preferable.

Moreover, if the foil thickness of the anode foil is not less than 70 μm, preferably not less than 90 μm, the anode foil decreases in resistivity to reduce the ESR, while if the foil thickness of the anode foil is not more than 180 μm, preferably not more than 150 μm, the volumetric efficiency of the capacitor improves, and thus downsizing of a capacitor is attainable. Therefore, it is preferable that the foil thickness is 70~180 μm, more specifically 90~150 μm.

Further, similarly to the case of the anode foil, another aluminum foil is subjected to an alternate etching or a chemical etching for surface roughening, and the void factor is set at not more than 44%, preferably not more than 35%, and more preferably not more than 26%, to thereby form a cathode foil. By so doing, the cathode foil decreases in resistivity to reduce the ESR of the solid electrolytic capacitor. Still further, in order to ensure the maximum capacity-volumetric efficiency, if the void factor is not less than 10%, the etching area increases to obtain a high capacity, and thus it is preferable. Moreover, if the foil thickness of the cathode foil is 50~180 μm, preferably 70~150 μm, and more preferably 70~100μm, the ESR further decreases and downsizing of a capacitor becomes attainable, and thus it is preferable.

At this stage, in a roll-type solid electrolytic capacitor wherein an organic semiconductor having a low resistivity is used and the void factor is reduced to increase conductivity of the electrode foils, the resistance value per unit area of the electrode foils or the inter-end resistance value of the square electrode foils (hereinafter, the foil resistance rate), the foil width and the foil area are optimized to further reduce the ESR of the capacitor.

In other words, by using an organic semiconductor having a resistivity of not more than 10 Ω·cm and the following electrode foil, it is possible to maximize the low resistivity characteristic of the organic semiconductor. The foil resistance rate of the electrode foils used for the present invention is 0.15~0.6 mΩ, more preferably 0.17~0.45 mΩ. By using the electrode foils of this range, the electrode foils decrease in resistivity to reduce the ESR. With the foil resistance rate below this range, the ESR-reducing effect is small, while with the foil resistance rate above this range, the ESR-reducing rate decreases.

Further, the foil width is 3~16 mm, preferably 5~14 mm. With the foil width below this range, even if the foil resistance rate is reduced, the contribution of resistivity of the electrolyte increases so that the ESR will not decrease. If the foil width exceeds this range, the ESR-reducing rate decreases, and the length of the capacitor element increases, so that the impregnation characteristic of the organic semiconductor decreases to reduce the electrolyte retention. As a result, the ESR increases.

The foil area needs to be not smaller than 300 mm$^2$, preferably not smaller than 500 mm$^2$. With the foil area below this range, the areas of the electrode foils and the electrolyte are small and the resistance rate will not decrease, as a result of which the ESR will not decrease. Further, the solid electrolytic capacitor according to the present invention uses a capacitor element formed by rolling the electrode foils laminated through a separator, for which reason an electrode foil having a long foil length can be used. Accordingly, a sufficient foil area is obtained, and the ESR decreases.

As described above, used for a cathode foil is an etched foil, and used for an anode foil is this etched foil, which is further turned on electricity in a conversion solution consisting of such solution as a phosphoric acid solution for forming an oxide film on the surface of this etched foil. Therefore, such electrode foil comprises a non-etching aluminum portion (hereinafter, a left-core) and an etching portion, and in case of an anode foil, the foil further comprises an oxide film portion. By setting the thickness of this left-core at 50~170 µm, more preferably 60~150 µm, the foil resistance rate can be set at 0.15~0.6 mΩ, more preferably 0.17~0.45 mΩ. If the thickness of the left-core is too large, it becomes difficult to carry out the rolling operation. Therefore, it is preferable that the thickness of the left-core is not more than 100 µm.

If the a TCNQ complex is used in this case as the organic semiconductor, a low ESR of 4~6 mΩ is achieved in response to the recent requests.

Further, even if a conductive polymer is used as the organic semiconductor, it is possible to obtain an ESR the same as or higher than the ESR when the TCNQ complex is used. Furthermore, if a polymer of the thiophene dielectric represented by (Chem. 1) is used as the conductive polymer, the heat resistance of the capacitor is improved, and thus it is preferable. The most preferable among others is 3,4-ethylene-dioxy-thiophene having a good reactivity and good electric properties.

For the surface-packaged solid electrolytic capacitor, which is required to be downsized, the width and the length of the electrode foil have to be as small as possible. In the surface-packaged roll-type solid electrolytic capacitor wherein a conductive polymer of a low resistivity is used and the void factor is reduced to increase conductivity of the electrode foils, the ESR of the capacitor can be further reduced by optimizing the foil resistance rate, the foil width and the foil area.

In other words, by using a conductive polymer with a resistivity of not more than 0.1 Ω·cm and the following electrode foil, it is possible to maximize the low resistivity characteristic of the conductive polymer, thereby realizing a solid electrolytic capacitor having an unprecedentedly low ESR characteristic. The foil resistance rate of the electrode foils used for the present invention is 0.27~0.7 mΩ, more preferably 0.34~0.55 mΩ. By using the electrode foils having a resistance rate of this range, the electrode foils decrease in resistivity to reduce the ESR. With the foil resistance rate below this range, the ESR-reducing effect is small, while with the foil resistance rate above this range, the ESR-reducing rate decreases.

Further, the foil width is 1.5~4 mm, preferably 2~3 mm. With the foil width below this range, even if the foil resistance rate is reduced, the contribution of resistivity of the electrolyte increases so that the ESR will not decrease. If the foil width exceeds this range, the ESR-reducing rate decreases, and the height of the capacitor increases to exceed the tolerance limit of the surface-packaged capacitor.

The foil area needs to be not smaller than 150 $mm^2$, preferably not smaller than 200 $mm^2$. With the foil area below this range, the areas of the electrode foils and the electrolyte are small and the resistance rate will not decrease, as a result of which the ESR will not decrease. Further, the solid electrolytic capacitor according to the present invention uses a capacitor element formed by rolling the electrode foils laminated through a separator, for which reason an electrode foil having a long foil length can be used. Accordingly, a sufficient foil area is obtained, and the ESR decreases.

As described above, in order to set the foil resistance rate of the electrode foil at 0.27~0.7 mΩ, and more preferably 0.34~0.55 mΩ, it is possible to use an electrode foil having a left-core thickness of 40~100 µm, and more preferably 50~80 mΩ.

Moreover, if a polymer of thiophene dielectric represented by (Chem. 1) is used as the conductive polymer, the ESR of the capacitor is reduced due to the low resistivity characteristic of not more than 0.1 Ω·cm, and the heat resisting characteristic improves, which is preferable. The most preferable among others is 3,4-ethylene-dioxy-thiophene having a good reactivity and good electric properties.

Further, if a conversion film of 0.1V~10V, preferably 0.3~5V, is formed on the cathode foil, the ESR decreases and the operating-life-at-high-temperature improves, and thus it is preferable.

Furthermore, if a layer comprising a metallic compound or a metal of a low oxidizing characteristic such as titanium nitride and titanium is formed on the surface of the cathode electrode, the electric capacitance increases, and thus it is preferable. It is further preferable if a conversion film is formed on the cathode electrode, and if the above-described layer comprising a metallic compound or a metal of a low oxidizing characteristic is formed on this conversion film.

The above-described anode foil and cathode foil are connected respectively with an anode-plug and a cathode-plug, and the anode foil and cathode foil laminated through a separator are rolled. Then, a voltage is applied to the laminated structure in a conversion solution for repairing the dielectric oxide film which was damaged during the prior processes. It is possible to obtain the effect of the present invention by using the above-described anode foil of the present invention and a conventional cathode foil or a conventional anode foil and the above-described cathode foil of the present invention.

The maximum effect can be obtained by using both of the anode foil and the cathode foil of the present invention.

Usable as a separator in this case are Manila paper, kraft paper, glass separator, nonwoven fabric made of synthetic fiber such as vinylon and polyester, and porous separator.

When a drawing means is connected with an electrode foil, if used is the electrode foil of the present invention with an increased conductivity, the contact resistance of the jointing of the electrode foil and the electrode-drawing means decreases to further reduce the ESR of the solid electrolytic capacitor.

A case of using a TCNQ complex as the solid electrolyte will be then described. The TCNQ complex is put in a cylindrical metal case comprising aluminum, and the case is placed on a heated flatbed heater for melting and liquefying the TCNQ complex. Then, the preheated above-described capacitor element is impregnated there, and the metal case is immersed in a cooling water for cooling and solidifying the TCNQ complex. Further, epoxy resin is poured into the case for heating and solidifying the content in the case in a high-temperature atmosphere. Thereafter, the content is subjected to heating and voltage application for a subsequent aging process, to thereby form a solid electrolytic capacitor.

In case that poly-(3,4-ethylene-dioxy-thiophene) (PEDT) or the polymer of 3,4-ethylene-dioxy-thiophene (EDT) is used as the solid electrolyte, the capacitor element is immersed in a solution prepared by mixing EDT, an oxidizing agent and a predetermined solvent for causing the EDT polymerization reaction in the capacitor element, to thereby form a solid electrolyte layer comprising PEDT. Then, this capacitor element is inserted in a metal case, and a sealing rubber is inserted in the opening edge of the metal case for sealing the same by the closing process, to thereby complete a solid electrolytic capacitor.

It is possible to use EDT monomer as the above-described EDT. It is also possible to use a monomer solution prepared by mixing EDT with a volatile solvent, wherein the volume ratio between EDT and the volatile solvent is in the range of 1:0~1:3. Usable as the above-described volatile solvent are hydrocarbons such as pentane, ethers such as tetrahydrofuran, esters such as ethyl formate, ketones such as acetone, alcohols such as methanol, and nitrogen compounds such as acetonitrile. Preferable among them are methanol, ethanol and acetone. Usable as the oxidizing agent are ferric paratoluenesulfonate dissolved with butanol and a solution of periodic acid or iodic acid. The preferable concentration of the oxidizing agent to the solvent is 40~50 wt %. If the concentration is below this range, the ESR increases, while if the concentration exceeds this range, the electric capacitance decreases.

The compounding ratio between EDT and the oxidizing agent (the solvent is not included) is preferably 1:0.9~1:2.2, and more preferably 1:1.3~1:2.0 by weight ratio. If the ratio is outside this range, the ESR increases. The conceivable reason for this is as follows. Namely, if the amount of the oxidizing agent to the monomer is too large, the relative amount of the monomer to be impregnated decreases, so that the amount of the PEDT to be formed decreases to increase the ESR. On the other hand, if the amount of the oxidizing agent is too small, the oxidizing agent necessary for polymerizing the monomer is insufficient, so that the amount of the PEDT to be formed decreases to increase the ESR.

As well as the above-described EDT, also applicable is a polymeric monomer. Usable as the polymeric monomer are aniline, pyrrole, furan and acetylene, and their derivatives, provided that they are subjected to oxidative polymerization by a predetermined oxidizing agent to form a conductive polymer.

In case that manganese dioxide is used as the solid electrolyte and as the inorganic electrolyte, the capacitor element is immersed in a manganese nitrate solution before heat-treating the same at a temperature of 300~400° C. Then, a voltage is applied to the capacitor element again in a conversion solution for repair conversion of the dielectric oxide film which was damaged during the heat treatment. A series of the processes, for example, the immersion in the manganese nitrate solution, the heat treatment, and the repair conversion is repeated a few times. Lastly, the capacitor element is subjected to a heat treatment at a temperature of 400~500° C. for another repair conversion. The capacitor element wherein manganese dioxide was formed as the solid electrolyte as described above is then contained in an outer case. Then, epoxy resin is poured into the case for heating and solidifying the content in the case before the case is sealed, to thereby form a solid electrolytic capacitor. As the above-described inorganic electrolyte, such materials as lead dioxide can be used.

Specific examples of the solid electrolytic capacitor of the present invention will be then described below.

EXAMPLE 5

Examples using a TSNQ complex as the solid electrolyte will be described. An aluminum foil is subjected to an alternate etching for surface roughening and then to a conversion for forming a dielectric oxide film, to thereby form the anode foil of the present invention. Further, another aluminum foil is similarly subjected to an alternate etching for surface roughening, so that a conversion film is formed on the surface thereof to form a cathode foil. The anode foil and the cathode foil are laminated through a separator comprising a Manila paper, and an anode-plug and a cathode-plug are connected respectively to the anode foil and the cathode foil at optional positions, before the lamination structure is rolled. Then, a voltage is applied to the laminated structure in a conversion solution for repair conversion of the dielectric oxide film which was damaged by the rolling operation.

On the other hand, the TCNQ complex is put in a cylindrical metal case comprising aluminum, and the case is then placed on a flatbed heater heated at approximately 280° C. for melting and liquefying the TCNQ complex. Then, the above-described capacitor element, which was preheated approximately 300° C., is impregnated there, and the metal case is promptly immersed in a cooling water for cooling and solidifying the TCNQ complex. Further, a necessary amount of epoxy resin is poured into the case for heating and solidifying the content in the case in a high-temperature atmosphere. Thereafter, the rated voltage is applied between the terminals at a temperature of 125° C. for one hour for a subsequent aging process, to thereby form a solid electrolytic capacitor of 10φ×10 L.

EXAMPLE 1-1

For a solid electrolytic capacitor formed as described above, a foil having a thickness of 100 μm and a post-etching void factor of 26% was used as an anode foil and a foil having a thickness of 85 μm and a post-etching void factor of 19% was used as a cathode foil, so as to use the solid electrolytic capacitor as the example 1-1.

EXAMPLE 1-2

For another solid electrolytic capacitor formed as described above, a foil having a thickness of 100 μm and a post-etching void factor of 46% was used as an anode foil and a foil having a thickness of 50 μm and a post-etching void factor of 39% was used as a cathode foil, so as to use the solid electrolytic capacitor as the example 1-2.

EXAMPLE 1-3

Still another solid electrolytic capacitor was formed by the same measure used for the example 1-2, except that a foil having a thickness of 100 μm and a post-etching void factor of 33% was used as an anode foil, so as to use the solid electrolytic capacitor as the example 1-3.

EXAMPLE 1-4

For yet another solid electrolytic capacitor formed as described above, a foil having a thickness of 100μm and a post-etching void factor of 52% was used as an anode foil and a foil having a thickness of 75 μm and a post-etching void factor of 22% was used as a cathode foil, so as to use the solid electrolytic capacitor as the example 1-4.

CONVENTIONAL EXAMPLE 1

Further, for another solid electrolytic capacitor formed as described above, a foil having a thickness of 100 μm and a post-etching void factor of 52% was used as an anode foil and a foil having a thickness of 50 μm and a post-etching void factor of 39% was used as a cathode foil, so as to use the solid electrolytic capacitor as the conventional example.

(Table 1) represents the comparisons between the foil resistances of the anode foils and the ESRs of the solid electrolytic capacitors of the examples 1-1~1-4 and the conventional example.

TABLE 1

|  | Anode foil | | | Cathode foil | | |
|---|---|---|---|---|---|---|
|  | Void factor (%) | Foil thickness (μm) | Foil resistance (mΩ/m) | Void factor (%) | Foil thickness (μm) | ESR (mΩ) |
| Example 1-1 | 26 | 100 | 75 | 19 | 85 | 5.8 |
| Example 1-2 | 46 | 100 | 153 | 39 | 50 | 8.5 |
| Example 1-3 | 33 | 100 | 91 | 39 | 50 | 7.8 |
| Example 1-4 | 52 | 100 | 231 | 22 | 75 | 7.7 |
| Conventional example 1 | 52 | 100 | 231 | 39 | 50 | 9.2 |

As can be seen from (Table 1), the ESR is reduced in the examples 1-2 and 1-3 using the anode foil of the present invention and in the example 1-4 using the cathode foil of the present invention, compared with the conventional example. Further, in the example 1-1 wherein an anode foil having a void factor of 26% and a cathode foil having a void factor of 19% are used, the ESR is reduced to 5.8 mΩ, achieving an unprecedentedly low ESR. Still further, the ESR is reduced more in the example 1-3 wherein an anode foil having a void factor of 33% is used than in the example 1-2 wherein an anode foil having a void factor of 46% is used.

Furthermore, as the void factor is reduced from 52% of the conventional example to 26~46% of the examples, the foil resistance is reduced from 231 mΩ/m to 75~153 mΩ/m. This reveals that an electrode foil increases in conductivity and decreases in resistivity.

As a comparative example, an electrolytic element was formed in a similar way to the example 1-1 and the electrolytic element was impregnated with an electrolytic solution having a low resistivity characteristic, to thereby form an electrolytic capacitor. The used electrolytic solution comprises 75 parts of γ-butyrolactone and 25 parts of ethyl phthalate-dimethyl-imidazolium. The obtained ESR is a high value of 52 mΩ, which reveals that the effect of the present invention cannot be obtained even with the use of the electrode foils of the present invention, if the solid electrolyte having a low resistivity characteristic is not used as the electrolyte.

EXAMPLE 2

An example using PEDT as the solid electrolyte will be then described. A nonwoven fabric made of vinylon fiber was used for a separator. For the cathode foil, a layer comprising titanium nitride was formed on a conversion film. Except for this, the same steps as those of the example 1 were taken to form a capacitor element, and then a repair conversion was carried out. Then, a solid electrolyte was formed as follows. A compound solution was prepared in a cup container by pouring therein EDT and a butanol solution containing 45% of ferric para-toluenesulfonate so that the weight ratio of the two become 1:0.8. Subsequently, the capacitor element was immersed in the above-described solution for ten seconds. The capacitor element was then heated at a temperature of 120° C. for one hour for causing the PEDT polymerization reaction in the capacitor element, to thereby form a solid electrolyte layer. Then, this capacitor element was inserted in a cylinder-shaped bottom-closed aluminum case, and the opening of the case was sealed with rubber by the closing process for a subsequent aging process, to thereby form a solid electrolytic capacitor of 10φ×10 L. Solid electrolytic capacitors using the same electrode foil of the example 1 were formed to be used as the examples 3-1~3-4 and the conventional example 3. (Table 2) represents the comparisons between the ESRs of these solid electrolytic capacitors.

TABLE 2

|  | Anode foil | | Cathode foil | | |
|---|---|---|---|---|---|
|  | Void factor (%) | Foil thickness (μm) | Void factor (%) | Foil thickness (μm) | ESR (mΩ) |
| Example 2-1 | 26 | 100 | 19 | 85 | 5.0 |
| Example 2-2 | 46 | 100 | 39 | 50 | 6.8 |
| Example 2-3 | 33 | 100 | 39 | 50 | 7.2 |
| Example 2-4 | 52 | 100 | 22 | 75 | 6.8 |
| Conventional example 2 | 52 | 100 | 39 | 50 | 8.1 |

As can be seen from (Table 2), the example 2 shows the same result as that of the example 1, namely, the example 2 reveals the effect of the present invention.

EXAMPLE 3

Subsequently formed is a surface-packaged chip-type solid electrolytic capacitor of a capacitor size of 6.3φ×6 L. The solid electrolytic capacitors formed in the same way as the example 1 were used for the examples 3-1, 3-2 and the conventional example 3-1. The solid electrolytic capacitors formed in the same way as the example 2 were used for the examples 3-3~3-6 and the conventional example 3-2. (Table 3) represents the void factor and the foil thickness of each of the used electrode foils, and the ESR of each of those solid electrolytic capacitors.

TABLE 3

|  | Anode foil | | Cathode foil | | | |
|---|---|---|---|---|---|---|
|  | Void factor (%) | Foil thickness (μm) | Void factor (%) | Foil thickness (μm) | Solid electrolyte | ESR (mΩ) |
| Example 3-1 | 26 | 100 | 19 | 85 | TCNQ | 17.9 |
| Example 3-2 | 33 | 100 | 39 | 50 | TCNQ | 22.2 |
| Example 3-3 | 26 | 100 | 19 | 85 | PEDT | 14.3 |
| Example 3-4 | 46 | 100 | 39 | 50 | PEDT | 17.4 |
| Example 3-5 | 33 | 100 | 39 | 50 | PEDT | 18.3 |
| Example 3-6 | 52 | 100 | 22 | 75 | PEDT | 17.4 |
| Conventional example 3-1 | 52 | 100 | 39 | 50 | TCNQ | 23.7 |
| Conventional example 3-2 | 52 | 100 | 39 | 50 | PEDT | 19.7 |

As can be seen from (Table 3), the chip-type solid electrolytic capacitor of the example 3 shows the similar result to those of the examples 1 and 2. Further, in the examples 3-1 and 3-3 wherein an anode foil having a void factor of 26% and a cathode foil having a void factor of 19% are used, the ESR is reduced by 5.8Ωm and 5.4Ωm respectively from the conventional examples 3-1 and 3-2. Namely, the effect of the present invention is great. Still further, in the example 3-3 wherein PEDT is used as the solid electrolyte, the ESR is reduced by 3.6 mΩ from the example 3-1 wherein the TCNQ complex is used. The example 3-3, a chip-type solid electrolytic capacitor, therefore achieves an unprecedentedly low ESR characteristic. Furthermore, a lead-free reflow test was carried out at the peak temperature of 250° C. for the solid electrolytic capacitors of the examples 3-3~3-6 wherein PEDT is used as the solid electrolyte. It was then found that there is no variation in electric capacitance and ESR and that the lead-free reflow is applicable to those solid electrolytic capacitors.

EXAMPLE 4

An example using manganese dioxide as the solid electrolyte will be then described. The capacitor element is immersed in a 40% solution of manganese nitrate before heat-treating the same at a temperature of 350° C. Then, a voltage is applied to the capacitor element again in a conversion solution for repair conversion of the dielectric oxide film which was damaged during the heat treatment. This set process of the immersion in the manganese nitrate solution, the heat treatment, and the repair conversion is repeated a few times. Lastly, the capacitor element is subjected to a heat treatment at a temperature of 450° C. for another repair conversion. This capacitor element wherein manganese dioxide was formed as the solid electrolyte as described above is then contained in an outer case. Then, epoxy resin is poured into the case for heating and solidifying the content in the case before the case is sealed, to thereby form a solid electrolytic capacitor of 10φ×10 L. Solid electrolytic capacitors using the same electrode foil of the example 1 were formed to be used as the examples 4-1, 4-2 and the conventional example 4. (Table 4) represents the void factor and the foil thickness of each of the used electrode foils, and the ESR of each of those solid electrolytic capacitors.

TABLE 4

|  | Anode foil | | Cathode foil | | |
| --- | --- | --- | --- | --- | --- |
|  | Void factor (%) | Foil thickness (μm) | Void factor (%) | Foil thickness (μm) | ESR (mΩ) |
| Example 4-1 | 26 | 100 | 19 | 85 | 14.6 |
| Example 4-2 | 33 | 100 | 39 | 50 | 17.7 |
| Conventional example 2 | 52 | 100 | 39 | 50 | 20.1 |

As can be seen from (Table 4), the example 4 shows the similar result to that of the example 1, revealing the effect of the present invention.

The present invention is not limited to the above-described examples, but the conditions for manufacturing solid electrolytic capacitor such as the etching condition and the conversion condition can be selected accordingly. Further, the solid electrolytic capacitor is not limited to the roll-type, and thus such types as lamination is also applicable.

To be described next is an example of the roll-type solid electrolytic capacitor wherein the organic semiconductor is used and the foil resistance rate, the foil width and the foil area are specified.

EXAMPLE 5

An example using the TCNQ complex as the organic semiconductor will be then described. An aluminum foil is subjected to an alternate etching for surface roughening and then a conversion for forming a dielectric oxide film, so that the abode foil of the present invention is formed. Another aluminum foil is similarly subjected to an alternate etching for surface roughening, so that a conversion film is formed on the surface thereof to form a cathode foil. The anode foil and the cathode foil are laminated through a separator comprising a Manila paper, and an anode-plug and a cathode-plug are connected respectively to the anode foil and the cathode foil at optional positions, so that the lamination structure is rolled. Then, a voltage is applied to the laminated structure in a conversion solution for repair conversion of the dielectric oxide film which was damaged by the rolling operation.

On the other hand, the TCNQ complex is put in a cylindrical metal case comprising aluminum, and the case is then placed on a flatbed heater heated at approximately 280° C. for melting and liquefying the TCNQ complex. Then, the above-described capacitor element, which was preheated approximately 300° C., is impregnated there, and the metal case is promptly immersed in a cooling water for cooling and solidifying the TCNQ complex. Further, a necessary amount of epoxy resin is poured into the case for heating and solidifying the content in the case in a high-temperature atmosphere. Thereafter, the rated voltage is applied between the terminals at a temperature of 125° C. for one hour for a subsequent aging process, to thereby form a solid electrolytic capacitor.

(Table 5) represents the foil resistance rate, the foil width, the foil area and the left-core thickness of the anode foil and the cathode foil used in the examples 5-1~5-3 and the comparative examples 5-1~5-4 the solid electrolytic capacitor formed as described above, as well as the ESR of the solid electrolytic capacitor of each example. For the examples 5-1~5-3, the foil thickness was 110 μm, 115 μm and 140 μm, respectively.

TABLE 5

|  | Foil resistance rate (mΩ) | Foil width (mm) | Foil area (mm²) | Left-core thickness (μm) | ESR (mΩ) |
| --- | --- | --- | --- | --- | --- |
| Example 5-1 | 0.40 | 6 | 1000 | 65 | 5.8 |
| Example 5-2 | 0.41 | 11 | 1850 | 64 | 3.9 |
| Example 5-3 | 0.25 | 6 | 800 | 102 | 5.7 |
| Comparative example 5-1 | 0.89 | 6 | 1950 | 32 | 8.1 |
| Comparative example 5-2 | 0.22 | 2 | 2100 | 119 | 9.8 |
| Comparative example 5-3 | 0.40 | 20 | 3400 | 65 | 7.1 |
| Comparative example 5-4 | 0.17 | 15 | 250 | 145 | 11.2 |

As can be seen from (Table 5), the solid electrolytic capacitors of the examples 5-1~5-3 of the present invention have a low ESR value of 6 mΩ, revealing the effect of the present invention. By contrast, in the comparative example 5-1 wherein the foil resistance rate is not less than 0.6 mΩ, the ESR becomes a high value of 8.1 Ωm, even though the example has the foil area of 1950 mm², which is larger than the foil areas of the examples 5-1~5-3. Further, in the comparative example 5-2 with the foil width of not more than 3 mm, the foil resistance rate is 0.22 mΩ, which is lower than the foil resistance rates of the examples 5-1~5-3. Further, the comparative example 5-2 has a high ESR value of 9.8 mΩ, even though the foil area of the example is 2100 mm², which is larger than the foil areas of the examples 5-1~5-3. The comparative example 5-3 with a foil width of over 6 mm also has a high ESR value of 7.1 mΩ. Still further, the comparative example 5-4 with a foil area of not larger than 300 mm² has a high ESR value of 11.2 mΩ, despite a small foil resistance rate of 0.17 mΩ, which is lower than the foil resistance rates of examples 5-1~5-3.

Furthermore, using the capacitor element formed in a similar way to the example 5-1, an electrolytic capacitor immersed with an electrolytic solution with a low resistivity characteristic was formed as the comparative example 5-5, and an electrolytic capacitor with manganese dioxide was formed as the comparative example 5-6. The electrolytic solution used for the comparative example 5-5 comprises 75 parts of γ-butyrolactone and 25 parts of ethyl phthalate-dimethyl-imidazolium. The obtained ESRs are respectively high values of 52 mΩ and 17 mΩ, which reveals that the effect of the present invention cannot be obtained even with the use of the electrode foils of the present invention, if an organic semiconductor having a low resistivity characteristic is not used.

EXAMPLE 6

An example using PEDT as the organic semiconductor will be then described. A nonwoven fabric made of vinylon fiber is used for a separator. For the cathode foil, a layer comprising titanium nitride is formed on a conversion film. Except for this, the same steps as those of the example 1 were taken to form a capacitor element, and then a repair conversion was carried out. Then, an organic semiconductor was formed as follows. A compound solution was prepared in a cup container by pouring therein EDT and a butanol solution containing 45% of para-toluenesulfonic acid ferric so that the weight ratio of the two become 1:0.8. Subsequently, the capacitor element was immersed in the above-described solution for ten seconds. The capacitor element was then heated at a temperature of 120° C. for one hour for causing the PEDT polymerization reaction in the capacitor element, to thereby form an organic semiconductor layer. Then, this capacitor element was inserted in a cylinder-shaped bottom-closed aluminum case, and the opening of the case was sealed with rubber by the closing process for a subsequent aging process, to thereby form a solid electrolytic capacitor. (Table 6) represents the foil resistance rate, the foil width, the foil area and the left-core thickness of the electrode foil used in each of the examples and the comparative examples, as well as the ESR of the solid electrolytic capacitor of each example. For the examples 6-1~6-3, the foil thickness was 115 μm, 110 μand 135 μm, respectively.

TABLE 6

| | Foil resistance rate (mΩ/m²) | Foil width (mm) | Foil area (mm²) | Left-core thickness (μm) | ESR (mΩ) |
|---|---|---|---|---|---|
| Example 6-1 | 0.41 | 6 | 1050 | 63 | 5.1 |
| Example 6-2 | 0.40 | 11 | 1800 | 65 | 3.5 |
| Example 6-3 | 0.24 | 6 | 850 | 105 | 4.9 |
| Comparative example 6-1 | 0.80 | 6 | 1450 | 30 | 7.2 |
| Comparative example 6-2 | 0.21 | 2 | 2150 | 121 | 8.6 |
| Comparative example 6-3 | 0.40 | 20 | 3350 | 64 | 6.5 |
| Comparative example 6-4 | 0.17 | 15 | 240 | 150 | 9.0 |

As can be seen from (Table 6), the example 2 shows the similar result to that of the example 1, revealing the effect of the present invention.

To be described next is an example of the roll-type solid electrolytic capacitor for surface-packaging wherein a conductive polymer is used and the foil resistance rate, the foil width and the foil area are specified.

An example using PEDT as a conductive polymer will be then described. A nonwoven fabric made of vinylon fiber is used for a separator. For the cathode foil, a layer comprising titanium nitride is formed on a conversion film. Except for this, the same steps as those of the example 1 were taken to form a capacitor element, and then a repair conversion was carried out. Then, a solid electrolyte was formed as follows. A compound solution was prepared in a cup container by pouring therein EDT and a butanol solution containing 45% of para-toluenesulfonic acid ferric so that the weight ratio of the two become 1:0.8. Subsequently, the capacitor element was immersed in the above-described solution for ten seconds. The capacitor element was then heated at a temperature of 120° C. for one hour for causing the PEDT polymerization reaction in the capacitor element, to thereby form a solid electrolyte layer. Then, this capacitor element was inserted in a cylinder-shaped bottom-closed aluminum case, and the opening of the case was sealed with rubber by the closing process for a subsequent aging process, to thereby form a solid electrolytic capacitor. (Table 7) represents the foil resistance rate, the foil width, the foil area and the left-core thickness of the anode foil and the cathode foil used in each of the example 7~9 and the comparative examples 7~9, as well as the ESR of the solid electrolytic capacitor of each example. For the examples 7~9, the foil thickness was 95 μm, 90 μm and 120 μm, respectively.

TABLE 7

| | Foil resistance rate (mΩ) | Foil width (mm) | Foil area (mm²) | Left-core thickness (μm) | ESR (mΩ) |
|---|---|---|---|---|---|
| Example 7 | 0.55 | 2.2 | 240 | 50 | 13 |
| Example 8 | 0.56 | 3 | 320 | 50 | 10 |
| Example 9 | 0.34 | 2.2 | 170 | 80 | 14 |
| Comparative example 7 | 0.91 | 2.2 | 335 | 31 | 17 |
| Comparative example 8 | 0.31 | 1 | 360 | 85 | 20 |
| Comparative example 9 | 0.32 | 2.2 | 110 | 84 | 19 |

As can be seen from (Table 7), the solid electrolytic capacitors of the examples 7~9 of the present invention have a low ESR value of not more than 15 mΩ revealing the effect of the present invention. By contrast, in the comparative example 7 wherein the foil resistance rate is not less than 0.7 mΩ, the ESR becomes a high value of 17 mΩ, even though the example has the foil area of 335 mm², which is larger than the foil areas of the examples 7~9. Further, in the comparative example 2 with the foil width of not more than 1.5 mm, the ESR is as high as 20 mΩ, even though the foil resistance rate of the example is 0.3 mΩ, which is smaller than the foil resistance rates of the examples 7~9, and also the foil area of the example is 360 mm², which is larger than the foil areas of the examples 7~9. Still further, in the comparative example 9 with the foil area of not larger than 150 mm², the ESR becomes a large value of 19 mΩ, despite a low foil resistance rate of 0.32 mΩ, which is smaller than the foil resistance rates of the examples 7~9.

Furthermore, for the comparative examples 10 and 11, capacitor elements were formed in a similar way to the example 7. For both of these electrolytic capacitors, a TCNQ complex and manganese dioxide were formed respectively as the solid electrolyte. The obtained ESRs are respectively high values of 17 mΩ and 6 mΩ, which reveals that the effect of the present invention cannot be obtained even with the use of the electrode foils of the present invention, if a conductive polymer having a low resistivity characteristic is not used as the electrolyte.

As described above, in accordance with the present invention, it is possible to achieve a solid electrolytic capacitor which uses a solid electrolyte as the electrolyte and has an unprecedentedly low ESR characteristic, if the post-etching void factor of the anode foil used for the capacitor element is made not higher than 51%, and if the post-etching void factor of the cathode foil used for the capacitor element is made not higher than 44%.

The invention claimed is:

1. A solid electrolytic capacitor comprising a capacitor element with a solid electrolyte comprising an organic semiconductor having a specific resistance of not more than 10 Ω·cm, wherein a thickness of an anode foil included in said capacitor element is 70~180 μm and an etched foil in used for said anode foil has a void factor of not less than 20% but not more than 51%.

2. The solid electrolytic capacitor as claimed in claim 1, wherein a complex of thiophene derivative is used as said organic semiconductor.

3. The solid electrolytic capacitor as claimed in claim 2, wherein the thiophene derivative comprises 3,4-ethylene-dioxy-thiophene.

4. The solid electrolytic capacitor as claimed in claim 2, wherein a foil resistance rate of said electrode foil is 0.27~0.7 mΩ.

5. A solid electrolytic capacitor comprising a capacitor element with a solid electrolyte comprising an organic semiconductor having a specific resistance of not more than 10 Ω·cm, wherein a thickness of an anode foil included in said capacitor element is 50~180 μm and an etched foil in used for said anode foil has a void factor of not less than 20% but not more than 51%.

6. The solid electrolytic capacitor as claimed in claim 5, wherein a complex of thiophene derivative is used as said organic semiconductor.

7. The solid electrolytic capacitor as claimed in claim 6, wherein the thiophene derivative comprises 3,4-ethylene-dioxy-thiophene.

8. The solid electrolytic capacitor as claimed in claim 6, wherein a foil resistance rate of said electrode foil is 0.27~0.7 mΩ.

* * * * *